(12) United States Patent
Alberola et al.

(10) Patent No.: US 10,147,055 B2
(45) Date of Patent: Dec. 4, 2018

(54) AGGREGATION RECORD FOR MANAGING ANCILLARY TRAVEL SERVICES

(71) Applicant: Amadeus S.A.S., Sophia Antipolis (FR)

(72) Inventors: Bertrand Alberola, Pegomas (FR);
Philippe Hurteloup, Grasse (FR);
Vanessa Fontebride, Le Rouret (FR);
Thomas Aurard, Antibes (FR);
Michael Lamy, Valbonne (FR)

(73) Assignee: AMADEUS S.A.S., Biot (FR)

( * ) Notice: Subject to any disclaimer, the term of this patent is extended or adjusted under 35 U.S.C. 154(b) by 850 days.

(21) Appl. No.: 14/250,765

(22) Filed: Apr. 11, 2014

(65) Prior Publication Data

US 2015/0294234 A1    Oct. 15, 2015

(51) Int. Cl.
*G06Q 10/00* (2012.01)
*G06Q 10/02* (2012.01)

(52) U.S. Cl.
CPC ................... *G06Q 10/02* (2013.01)

(58) Field of Classification Search
CPC ........ G06Q 10/02; G06Q 50/14; G06Q 50/12; G06Q 50/30; G06Q 30/06
See application file for complete search history.

(56) References Cited

U.S. PATENT DOCUMENTS

| 2002/0152100 A1* | 10/2002 | Chen ..................... G06Q 10/02 705/5 |
| 2003/0177044 A1* | 9/2003 | Sokel .................... G06Q 10/02 705/5 |
| 2004/0153347 A1* | 8/2004 | Kunze ................... G06Q 10/02 705/4 |
| 2008/0077453 A1 | 3/2008 | Pedron et al. |

(Continued)

FOREIGN PATENT DOCUMENTS

AU    2012238999    10/2012

OTHER PUBLICATIONS

Thibaut Ruy, "AFRAA EMD Workshop", Mar. 28, 2012, IATA, http://www.afraa.org/index.php?view=download&alias=46-2-iata-how-emd-really-works&category_slug=events&option=com_docman &layout=table&Itemid=160 retrieved Jul. 27, 2018 (Year: 2012).*

(Continued)

*Primary Examiner* — George Chen
(74) *Attorney, Agent, or Firm* — Thompson Hine LLP (57) ABSTRACT

Methods, systems, and computer program products for managing an Electronic Miscellaneous Document (EMD). In response to receiving a request for an ancillary service, an aggregation module generates an aggregation record. The aggregation module may obtain passenger and segment data from a plurality of Passenger Name Records (PNRs), and add this data to the aggregation record. The aggregation record may thereby provide a database object including passenger and segment data from multiple PNRs associated with an itinerary. The aggregation record may be associated with an EMD, and may be configured so that a single EMD can be issued to a traveler for an ancillary service provided across an itinerary comprising multiple PNRs. A mapping record may also be generated that links the EMD, aggregation record, and PNRs. The mapping record may thereby provide an index that enables a database to quickly identify relationships between EMDs, aggregation records, and PNRs.

20 Claims, 4 Drawing Sheets

(56) References Cited

U.S. PATENT DOCUMENTS

| | | |
|---|---|---|
| 2008/0294469 A1 | 11/2008 | Caballero et al. |
| 2011/0029336 A1* | 2/2011 | Vieillard-Baron ........................... G06Q 10/025 705/6 |
| 2012/0004936 A1 | 1/2012 | Hamblett et al. |
| 2012/0254261 A1 | 10/2012 | Edwards et al. |
| 2012/0259667 A1* | 10/2012 | Pelissier ................ G06Q 50/14 705/5 |
| 2014/0200932 A1* | 7/2014 | Daouk ................... G06Q 10/02 705/5 |

OTHER PUBLICATIONS

AU, Patent Examination Report No. 1; Australian Patent Application No. 2015201818 (dated Mar. 7, 2016).

* cited by examiner

AGGREGATION RECORD FOR MANAGING ANCILLARY TRAVEL SERVICES

BACKGROUND

The invention generally relates to computers and computer systems and, in particular, to methods, systems, and computer program products for managing issuance and use of an Electronic Miscellaneous Document (EMD) for an itinerary including multiple Passenger Name Records (PNRs).

An EMD is an electronic document which may be issued in response to a traveler purchasing an ancillary service. The EMD provides proof that the traveler is entitled to receive the ancillary service so that the traveler may obtain the service without the need for a paper coupon. EMDs thus facilitate selling add-on products and services to travelers using electronic tickets. Exemplary services for which EMDs may be issued include allowances to carry additional luggage, entitlements to enter special zones such as business lounges, receipt of a meal or a drink during a travel segment (e.g., a flight), choose a specific seat (e.g., a window seat, an aisle seat, a seat with extra leg room, etc.), receive transportation services between an airport and a hotel, or receive premium in-flight services. Because the EMD provides the traveler with the right to receive the service, EMDs are typically not issued until the traveler has paid for the service. EMDs thereby supplement electronic tickets by defining additional services or upgrades that the traveler has purchased.

Electronic ticketing systems typically use one or more PNRs to track electronic tickets. The PNR may provide details of a traveler's reservation and other data related to the traveler's trip. PNRs may also contain data to assist airline personnel with passenger handling. This data may be broadly categorized as traveler data and segment data. Traveler data includes data relating to the passenger, such as the name or contact data for the traveler. Segment data includes data relating to a service being provided to satisfy the itinerary, such as a flight number or other identifying data for one or more services reserved or purchase by the traveler. Specific data typically found in the PNR may include the name of the traveler, a passenger type code, data identifying one or more reserved travel segments, contact data for the traveler, when and where tickets are to be issued, and the ticketing office or agent that made or updated the reservation. When an EMD is issued for an ancillary service, the PNR including the corresponding travel segment may be updated with data associating the PNR with the EMD. The travel service provider may thereby associate the segments in the PNR with the EMD for the corresponding ancillary service purchased by the traveler.

In some cases, the itinerary may be spread across more than one PNR. This may occur, for example, when different segments of a trip are booked through different travel agents, or are booked with different carriers. In this case, the PNR elements associated with the traveler data may be duplicated in multiple operating PNRs (e.g., one PNR per airline). Because each carrier's departure control system handles the system's corresponding operating PNRs, a separate EMD must typically be issued for each PNR in order to provide an ancillary service across the itinerary. The resulting plurality of EMDs can be confusing for the traveler, the travel agent, and the service provider, and adds to the computational overhead of the electronic ticketing system.

Thus, improved systems, methods, and computer program products are needed for generating, issuing, and managing EMDs in the travel industry.

SUMMARY

In an embodiment of the invention, a method of adding an ancillary service to an itinerary is provided. The method includes receiving a request to add the ancillary service to the itinerary, the itinerary including a first travel service associated with a first passenger name record and a second travel service associated with a second passenger name record. The method further includes receiving portions of the first passenger name record and the second passenger name record, aggregating the portions into an aggregation record, issuing an electronic miscellaneous document for the ancillary service, and associating the electronic miscellaneous document with the aggregation record.

In another embodiment of the invention, an apparatus for adding the ancillary service to the itinerary is provided. The apparatus includes a processor and a memory coupled to the processor. The memory includes instructions that, when executed by the processor, cause the apparatus to receive the request to add the ancillary service to the itinerary, the itinerary including the first travel service associated with the first passenger name record and the second travel service associated with the second passenger name record. The instructions may further cause the apparatus to receive the portions of the first and second passenger name records, aggregate the portions into the aggregation record, issue the electronic miscellaneous document for the ancillary service, and associate the electronic miscellaneous document with the aggregation record.

In another embodiment of the invention, a computer program product is provided that includes a non-transitory computer readable storage medium including instructions. The instructions may be configured, when executed by the processor, to cause the processor to receive the request to add the ancillary service to the itinerary, the itinerary including the first travel service associated with the first passenger name record and the second travel service associated with the second passenger name record. The instructions may further cause the processor to receive the portions of the first and second passenger name records, aggregate the portions into the aggregation record, issue the electronic miscellaneous document for the ancillary service, and associate the electronic miscellaneous document with the aggregation record.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention may be implemented by a computing system comprising one or more networked computers or servers. The computing system may provide processing and database functions for travel-related systems and modules, such as an Electronic Miscellaneous Document (EMD) module. In an embodiment of the invention, the EMD module receives a request for an ancillary service that is to be provided for travel services associated with a plurality of Passenger Name Records (PNRs). In response to receiving the request, the EMD module may retrieve data from each of the PNRs and aggregate this data into an aggregation record. Thus, the aggregation record comprises PNR data for the itinerary. A single EMD may then be issued for the aggregation record. The EMD module may also generate a mapping record that associates the aggregation record with the PNRs. The aggregation record and mapping record may work in combination to link the single EMD to each of the PNRs. By enabling service provider systems, such as a departure control system of a carrier, to associate the EMD with their corresponding PNR, embodiments of the invention may enable the traveler to obtain ancillary services across multiple service providers with a single EMD.

Figure 1:
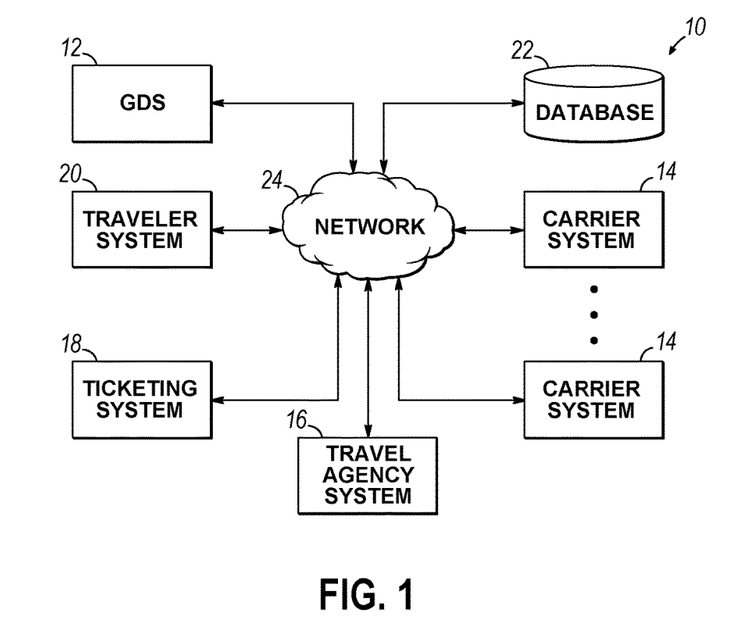
FIG. 1 is a diagrammatic view of an exemplary operating environment including a plurality of computing systems in communication via a network.

Referring now to FIG. 1, an operating environment 10 in accordance with an embodiment of the invention may include a Global Distribution System (GDS) 12, one or more travel service provider systems, such as carrier systems 14, one or more on-line travel agency or other indirect seller systems, such as travel agency system 16, a ticketing system 18, one or more traveler systems 20, and a document database 22. Each of the GDS 12, carrier systems 14, travel agency system 16, ticketing system 18, traveler system 20, and document database 22 may communicate through a network 24. The network 24 may include one or more private and/or public networks (e.g., the Internet) that enable the exchange of data.

The GDS 12 may be configured to facilitate communication between the carrier systems 14 and travel agency system 16 by enabling travel agents, validating carriers, or other indirect sellers to search for available services and book reservations on one or more carrier systems 14 via the GDS 12. To this end, the GDS 12 may maintain links to each of the carrier systems 14 via the network 24. These links may allow the GDS 12 to obtain scheduling and availability data for services from the carrier systems 14. The travel agency system 16 may thereby book flights, trains, hotels, rental cars or other services from multiple service providers via a single connection to the GDS 12.

In response to a service being booked, the GDS 12 may receive and store a PNR for that service. The PNR may be generated, at least in part, by the carrier systems 14, and may comprise one or more reservation records comprised of segments and traveler data associated with one or more booked reservations. PNR segments may be identified, for example, as active (e.g., for a service yet to be provided by the corresponding service provider), passive (e.g., for a service reserved in another system or provided by a third party), past date, flown, information, open (e.g., for a purchased service having an open date), or canceled. The PNR may be stored in a database accessible to GDS 12, carrier system 14, travel agency system 16 and ticketing system 18, such as the document database 22. The PNR may be identified by a record locator unique to that PNR, and may include segments defining an itinerary for a particular trip, service, passenger, or group of passengers. The itinerary may include services from multiple carriers (e.g., flights, bus, and or rail segments), hotel reservations, rental car reservations, or any other travel-related services.

The GDS 12 may access the document database 22 to store and retrieve data relating to electronic tickets or other electronic documents associated with a purchased travel service. Although depicted as comprising a single database, the document database 22 may comprise multiple databases. Persons having ordinary skill in the art will therefore understand that embodiments of the invention may operate with multiple databases, such as separate PNR databases operated by individual service providers, schedule and availability databases for services, or any other suitable database. For example, each carrier system 14 may include a separate database for storing and retrieving data related to reserving travel services, tracking service provider inventory, and issuing electronic tickets for the reserved travel services.

Each electronic ticket or EMD, referred to collectively as electronic documents, may comprise one or more electronic coupons stored in the document database 22, with each coupon corresponding to a service provided by the electronic ticket or EMD. In response to one or more of the electronic coupons being used, exchanged, or refunded, the document database 22 may be updated to reflect a change in status of the electronic document.

The carrier systems 14 may each include a Computer Reservation System (CRS) and/or billing system for the respective service provider. The CRS may enable the GDS 12 and/or travel agency system 16 to reserve and pay for ticketed services, such as flights, rail services, hotel rooms, or rental cars, as well as ancillary services associated with the ticketed services.

The travel agency system 16 may include a web server that provides a publicly accessible website. This website may be configured to provide access to travel planning features, such as the ability to search for travel products matching a travel request. To this end, the travel agency system 16 may provide the traveler with access to data from one or more databases hosted by the GDS 12, carrier systems 14, travel agency system 16, and/or ticketing system 18, as well as access to data in the document database 22.

The ticketing system 18 may be in communication with the travel agency system 16 via the network 24 or some other suitable connection. In alternative embodiments of the invention, all or a portion of the ticketing system 18 may be integrated into one or more of the other systems, such as the GDS 12. In any case, travelers or travel agents may use the travel agency system 16 to search for and book travel services, and the ticketing system 18 may issue and manage electronic documents stored in the database 22 for the purchased services.

The traveler system 20 may be any suitable computing system configured to communicate over the network 24. For example, the traveler system 20 may comprise a desktop, laptop, or tablet computer, a smart phone, a personal digital assistant, or any other computing device that enables the traveler to search for and book travel services over the network 24. In an embodiment of the invention, the traveler system 20 may include a client application, such as a web-browser, that communicates with a server application hosted by the travel agency system 16, such as a web-server.

The server application may, in turn, communicate with the GDS 12, carrier systems 14, and/or ticketing system 18 to obtain data relating to available travel services so that the traveler may book travel services and be issued electronic documents.

Figure 2:
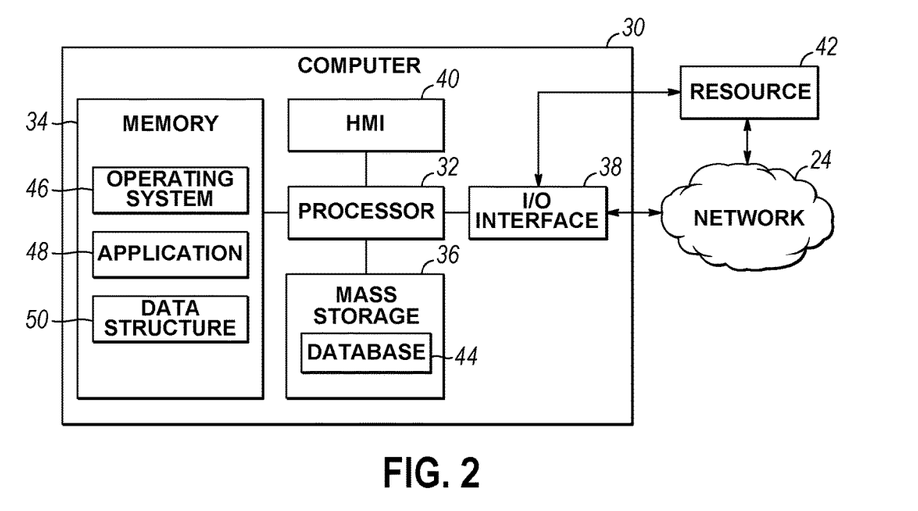
FIG. 2 is a diagrammatic view of an exemplary computing system of FIG. 1.

Referring now to FIG. 2, the GDS 12, carrier systems 14, travel agency system 16, ticketing system 18, traveler system 20, document database 22, and network 24 of operating environment 10 may be implemented on one or more computing devices or systems (collectively referred to herein as a computer), such as computer 30. The computer 30 may include a processor 32, a memory 34, a mass storage memory device 36, an input/output (I/O) interface 38, and a Human Machine Interface (HMI) 40. The computer 30 may also be operatively coupled to one or more external resources 42 via the network 24 and/or I/O interface 38. External resources may include, but are not limited to, servers, databases, mass storage devices, peripheral devices, cloud-based network services, or any other suitable computing resource that may be used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing data. The mass storage memory device 36 may include data storage devices such as a hard drive, optical drive, tape drive, non-volatile solid state device, or any other device capable of storing data. A database 44 (e.g., the document database 22) may reside on the mass storage memory device 36, and may be used to collect and organize data used by the various systems and modules described herein.

Processor 32 may operate under the control of an operating system 46 that resides in memory 34. The operating system 46 may manage computing resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, and/or application 48 to store or manipulate data.

The I/O interface 38 may provide a machine interface that operatively couples the processor 32 to other devices and systems, such as the network 24 and/or external resource 42. The application 48 may thereby work cooperatively with the network 24 and/or external resource 42 by communicating via the I/O interface 38 to provide the various features, functions, applications, processes, and/or modules comprising embodiments of the invention. The application 48 may also have program code that is executed by one or more external resources 42, or otherwise rely on functions and/or signals provided by other system or network components external to the computer 30. Indeed, given the nearly endless hardware and software configurations possible, persons having ordinary skill in the art will understand that embodiments of the invention may include applications and databases that are located externally to the computer 30, distributed among multiple computers or other external resources 42, or provided by computing resources (hardware and software) that are provided as a service over the network 24, such as a cloud computing service.

The HMI 40 may be operatively coupled to the processor 32 of computer 30 in a known manner to allow a user to interact directly with the computer 30. The HMI 40 may include video and/or alphanumeric displays, a touch screen, a speaker, and any other suitable audio and visual indicators capable of providing data to the user. The HMI 40 may also include input devices and controls such as an alphanumeric keyboard, a pointing device, keypads, pushbuttons, control knobs, microphones, etc., capable of accepting commands or input from the user and transmitting the entered input to the processor 32.

Figure 3:
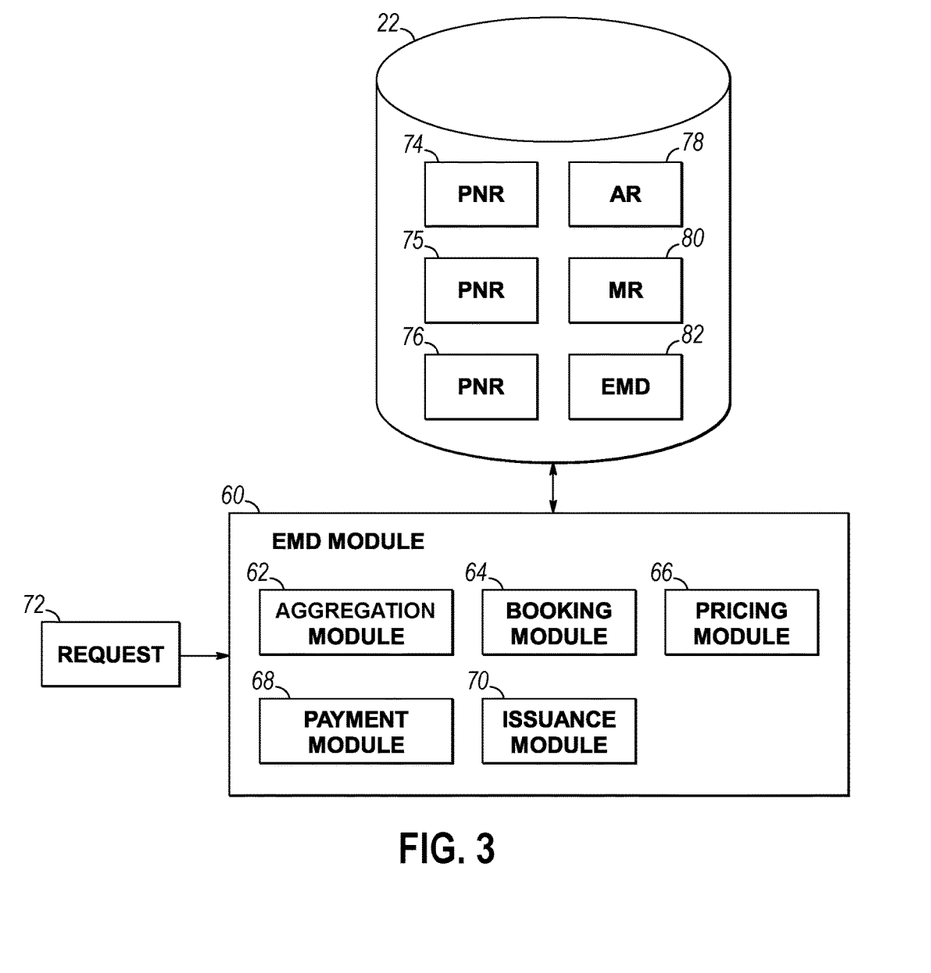
FIG. 3 is a schematic view of an Electronic Miscellaneous Document (EMD) module including an aggregation module in communication with a database having a plurality of Passenger Name Records (PNRs) and an aggregation record.

Referring now to FIG. 3, an EMD module 60 may be provided by one or more applications 48 residing on one or more computing systems, such as the GDS 12, the ticketing system 18, or any other suitable computing system. The EMD module 60 may be in communication with the document database 22, and may include an aggregation module 62, a booking module 64, a pricing module 66, a payment module 68, and an issuance module 70. The EMD module 60 may receive a request 72 from an external source, such as the travel agency system 16 or the traveler system 20. The document database 22 may include a plurality of PNRs 74-76 associated with a particular itinerary, an aggregation record 78, a mapping record 80, and an EMD 82. Although shown as storing three PNRs associated with the itinerary, embodiments of the invention are not limited to any particular number of PNRs. Thus, persons having ordinary skill in the art will understand that the document database 22 may include any number of PNRs, and that the PNRs may be associated with any number of travel itineraries. In an embodiment of the invention, the PNRs 74-76, aggregation record 78, and mapping record 80 may reside on the same database to facilitate operation of the system. However, the invention is not so limited, and other embodiments may have PNRs 74-76, aggregation records 78, and mapping records 80 spread across multiple databases.

The aggregation module 62 may be configured to generate the aggregation record 78, and aggregate the passenger data from the plurality of PNRs 74-76 into the aggregation record 78, in response to receiving the request 72. If an additional request 72 is received for an additional ancillary service relating to the PNRs 74-76, the aggregation module 62 may save any additional data relating to the ancillary service to the existing aggregation record 78. A single aggregation record 78 may thereby serve an itinerary comprising multiple PNRs. The aggregation module 62 may also determine if any information segments are present in the PNRs 74-76. The aggregation module 62 may add copies of the information segments to the aggregation record 78, and may mark these segments as active segments.

The aggregation module 62 may be further configured to aggregate the passenger data of the PNRs 74-76 into the aggregation record 78. To this end, the aggregation module 62 may scan the PNRs 74-76 to distinctly identify the passenger data and the segment data. The aggregation module 62 may then identify a common passenger in the different PNRs 74-76 based on the passenger data, and associate the common passenger to the corresponding information segments found in the PNRs 74-76. The aggregation module 62 may thereby merge passenger data from multiple PNRs 74-76 into the aggregation record 78, and associate the aggregated passenger data to each of the individual segments in the PNRs 74-76. The aggregation module 62 may thereby incorporate different sets of similar data, (e.g., different sets of contact data for a specific passenger) into the aggregation record 78.

The booking module 64 may be configured to add booking data to the PNRs 74-76 and the aggregation record 78. Booking the ancillary service may comprise adding the booking data to the respective PNRs 74-76. In response to the ancillary service being booked, the booking module 64 may add the booking data to the aggregation record 78. In an embodiment of the invention, the booking data may be added to the PNRs 74-76, and then copied from the PNRs 74-76 to the aggregation record 78. By adding the booking data to the PNRs 74-76 corresponding to the travel services to which the ancillary service relates, and then copying the booking data from the PNRs 74-76 to the aggregation record 78, embodiments of the invention may preserve backward compatibility with existing booking software. That is, existing software used for booking ancillary services to the PNRs 74-76 may be used because the PNR structure is preserved.

In an alternative embodiment of the invention, the booking module 64 may be configured to add the booking data directly to the aggregation record 78. In particular, booking data relating to information segments may be directly added to the aggregation record 78. For example, booking data may be added to an information segment after the segment has been marked as active. The booking module 64 may also be configured to add data to the PNRs 74-76 or directly to the aggregation record 78 selectively. For example, the booking module 64 may be configured to: (1) add the booking data directly to the aggregation record 78 when the booking data relates to information segments, and (2) copy the booking data from the PNRs 74-76 as described above for all other types of segments.

The pricing module 66 may be configured to price the ancillary service and add pricing data to one or more of the PNRs 74-76, as well as to the aggregation record 78. The payment module 68 may be configured to obtain payment for the ancillary service, and add payment data to the respective PNRs 74-76 and the aggregation record 78. By keeping the PNRs 74-76 up to date regarding pricing and payment for the ancillary service, embodiments of the invention may maintain compatibility with existing automated accounting systems. For example, accounting systems may be able to continue adding accounting data to an interface record (IR) by obtaining the payment data from the PNRs 74-76 rather than being reconfigured to obtain the payment data from the aggregation record 78. Moreover, by keeping the PNRs 74-76 up to date, service providers accessing the PNRs 74-76 may be provided with up-to-date data with respect to the ancillary services bought by the traveler.

The issuance module 70 may be configured to issue the ancillary service in response to receiving payment. Issuing the ancillary service may comprise adding issuing data to the PNRs 74-76 and aggregation record 78, and generating the EMD 82. The EMD 82 may contain data identifying the issued ancillary service so that service providers can verify that the traveler has purchased the service based on the EMD 82. Service provider systems (e.g., departure control systems) may thereby determine whether the traveler is entitled to receive the ancillary service by accessing the aggregation record 78 and EMD 82.

The aggregation record 78 may comprise a database object that provides a repository for PNR data from multiple PNRs associated with a single trip. The aggregation record 78 may thereby provide a single record that can be used to validate the EMD 82 across multiple PNRs and for travel services from different service providers. To facilitate operation of the document database 22, the aggregation record 78 may include a record locator, session identity number, or other data that identifies the aggregation record 78.

The mapping record 80 may link the PNRs 74-76 and the aggregation record 78 to facilitate identification of the PNRs 74-76 and the aggregation record 84 that are associated with a particular itinerary or EMD 82. The mapping record 80 may include a record locator, which may be assigned, for example, by a database management system or the aggregation module 62. Multiple records associated with a purchased ancillary service may be linked by the mapping record 80 to provide an index for the document database 22. The mapping record 80 may enable the document database 22 to quickly locate all records associated with a particular itinerary based on a single PNR record locator or other identifying data. The mapping record 80 may thereby improve the responsiveness of the document database 22 to queries from applications, such as the aggregation module 62, the departure control system, or any other application supporting the issuance and use of electronic documents.

Figure 4:
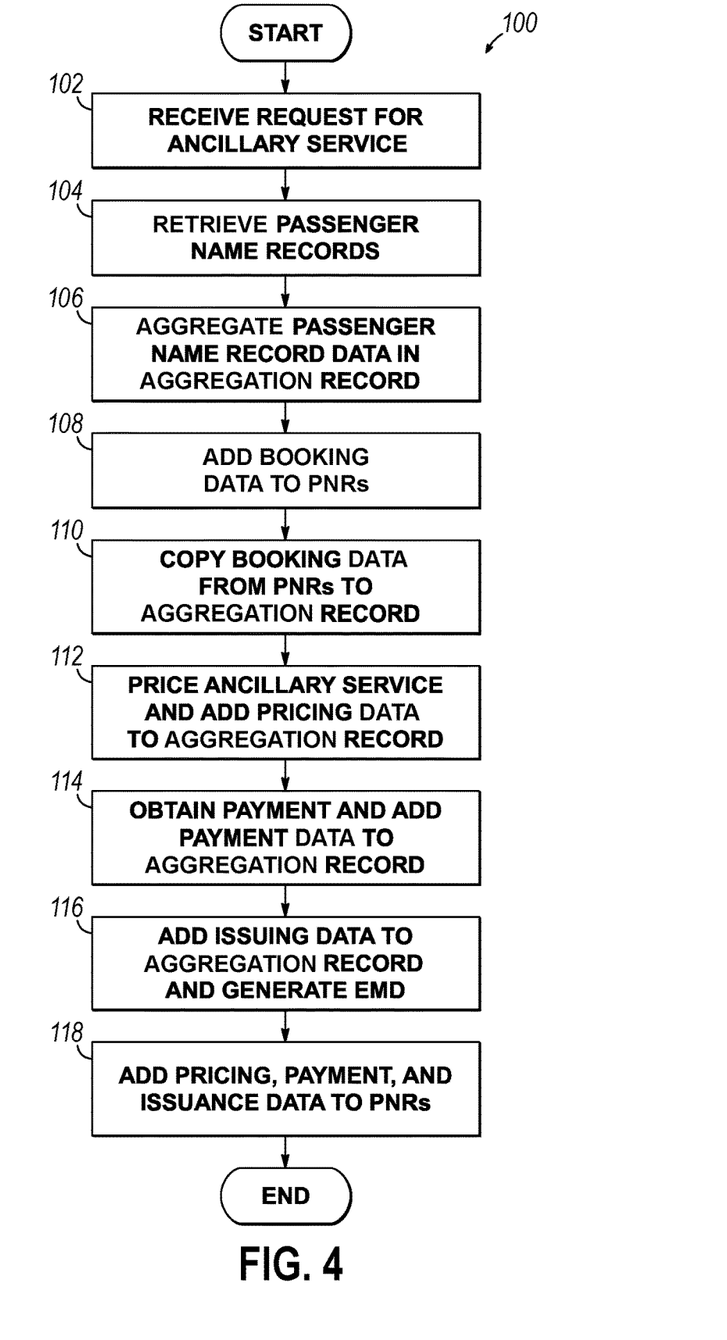
FIG. 4 is a flowchart of a process that may be executed by the EMD module of FIG. 3 to generate the aggregation record and the EMD.

Referring now to FIG. 4, a flowchart depicting a process 100 that may be implemented for issuing the EMD is presented. In block 102, the process 100 may receive the request 72 for the ancillary service. The request 72 may be received, for example, from the travel agency system 16, traveler system 20, or some other system through which the traveler is shopping for travel services. The request 72 may include data relating to the traveler (e.g., the name of the traveler), data relating to the itinerary to which the travel service is to be added, data identifying PNRs or other electronic documents related to the itinerary (e.g., one or more record locators), or any other suitable data.

In response to receiving the request 72, the process 100 may proceed to block 104 and retrieve the PNRs 74-76 relating to the ancillary service. For example, the process 100 may query the document database 22 for any PNRs 74-76 that include a travel service to which the ancillary service applies. In response to receiving the query, the document database 22 may transmit the corresponding PNRs 74-76 to the aggregation module 62. In an embodiment of the invention, the request 72 may include one or more record locators that identify the PNRs 74-76. These record locators may in turn be included in the query to the document database 22 to identify the PNRs 74-76.

In response to receiving the PNRs 74-76, the process 100 may proceed to block 106. In block 106, the process 100 may aggregate the PNR data by adding the data from the PNRs 74-76 to the aggregation record 78. To this end, the process 100 may determine if any of the PNR data is duplicated across more than one of the PNRs 74-76, or is already included in the aggregation record 78. Based on this determination, the process 100 may selectively add data from the PNRs 74-76 so that the aggregation record 78 does not include duplicate data. For example, the traveler name and contact data may be added just once to a newly generated aggregation record 78, or may not need to be added to an existing aggregation record 78. In an embodiment of the invention, the process 100 may assign a record locator to the aggregation record 78 that enables the aggregation record 78 to be uniquely identified.

In block 108, the process 100 may add booking data to the PNRs 74-76. The booking data may identify the ancillary service being purchased as well as the service or itinerary to which the ancillary service is being added. In response to adding the booking data to the PNRs 74-76, the process 100 may proceed to block 110 and copy the booking data from the PNRs 74-76 to the aggregation record 78. To this end, the process 100 may read any segments comprising booking data from the PNRs 74-76, remove any duplicate segments or data, and write the remaining segments to the aggregation record 78. The process 100 may then proceed to block 112.

In block 112, the process 100 may price the ancillary service. Pricing the service may include querying a pricing engine (not shown) for the price of the ancillary service. The pricing engine may reside, for example, in the GDS 12 or one of the carrier systems 14. In response to determining the price of the ancillary service, the process 100 may add the pricing data to the aggregation record 78. For example, the process 100 may add a segment to the aggregation record 78 that includes the pricing data. The process 100 may then proceed to block 114.

In block 114, the process 100 may obtain or receive payment for the ancillary service. Payment may be obtained, for example, by the traveler entering a method of payment through a website operated by the travel agency. In response, a billing system or module may debit an account provided by the traveler for the cost of the ancillary service, and notify the EMD module 60 that payment has been obtained.

In response to obtaining payment, the process 100 may proceed to block 116 and issue the ancillary service. The ancillary service may be issued by adding the issuing data to the aggregation record 78. The process 100 may then generate the EMD 82, which may identify the issued ancillary service and the segments to which the service applies. Optionally, the process 100 may link the EMD 82 to the mapping record 80, thereby associating the EMD 82 with the PNRs 74-76 and aggregation record 78. Linking the EMD 82 to the mapping record 80 may improve the ability of the document database 22 to identify records associated with the EMD 82. Once the aggregation module 62 has been fully updated to reflect the issuance of the EMD 82, and the EMD 82 has been generated, the process may proceed to block 118.

In block 118, the process 100 may add the pricing, payment, and issuance data to the PNRs 74-76. To this end, the process 100 may copy the pricing, payment, and issuance data from the aggregation record 78. The process 100 may then determine which PNRs 74-76 have segments to which the ancillary service applies, and write the data to those PNRs 74-76 by adding the data to the corresponding segment in the PNR 74-76, or by adding additional segments to the corresponding PNR 74-76. In an alternative embodiment of the invention, the pricing, payment, and issuance data may be added to the PNRs 74-76 concurrently with the addition of this data to the aggregation record 78. In this alternative embodiment, the process 100 may remove added pricing and payment data from the PNRs 74-76 in response to the EMD 82 not being issued, such as if the traveler changes their mind during the purchasing process.

Figure 5:
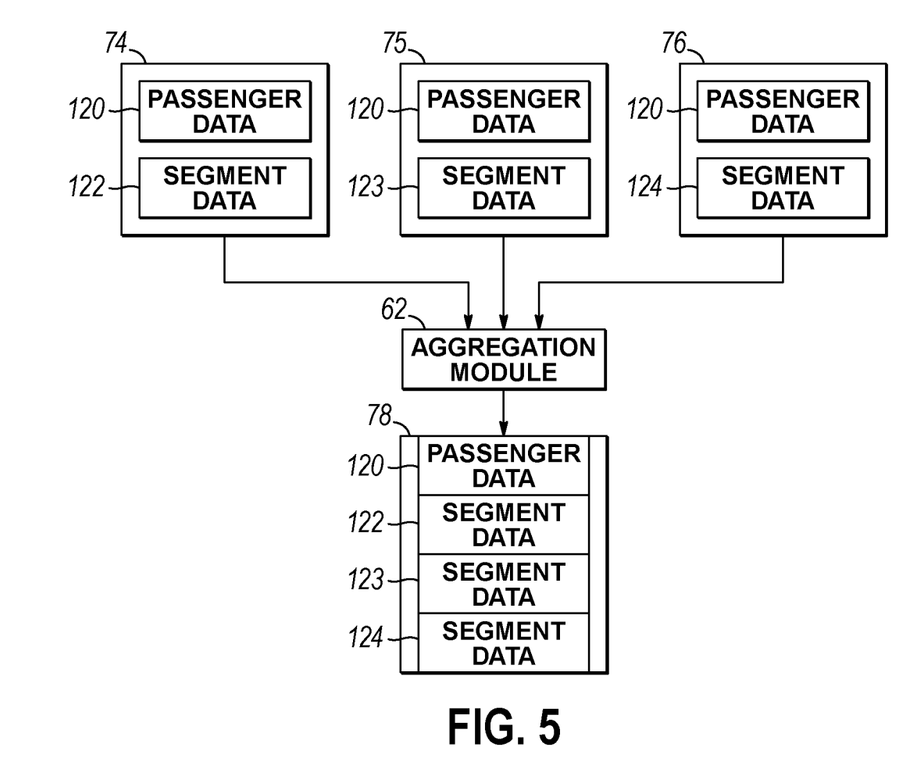
FIG. 5 is a diagrammatic view showing additional details of the PNRs and the aggregation record of FIG. 3.

Referring now to FIG. 5, the process of aggregating data from the PNRs 74-76 into the aggregation record 78 is illustrated in more detail. By way of example, in the case where a single traveler has booked segments across multiple carriers, each of the PNRs 74-76 may include the same passenger data 120 as the other PNRs 74-76, but different segment data 122-124. In this exemplary case, the aggregation module 62 may aggregate the respective segment data 122-124 into the aggregation record 78 with a single copy of the passenger data 120. Although not depicted in FIG. 5, the booking, pricing, payment, and issuance data may be added to the aggregation record 78 by the respective modules as described above with respect to FIGS. 3 and 4.

In cases where the passenger data 120 included in each of the PNRs 74-76 relates to the same passenger, the passenger data 120 may nevertheless not be identical between different PNRs 74-76. For example, each PNR 74-76 may include passenger data 120 having different contact data. The aggregation module 62 may account for this by aggregating the non-duplicate data to the aggregation record 78 and discarding the duplicate data.

Each of the PNRs 74-76 may also include data for more than one passenger. That is, one PNR may define travel arrangements for multiple travelers, in which case PNRs 74-76 may include data for different passengers. For example, one or more of the PNRs 74-76 may include passenger data for an additional passenger on one segment of the itinerary, but not other segments. This may occur, for example, if a companion joins the traveler mid-way through the itinerary. In this case, the aggregation module 62 may add a copy of the additional passenger data to the aggregation record 78, as well as associate this data with the corresponding segment data in the aggregation record 78. The aggregation module 62 may also add information segments in the PNRs 74-76 to the aggregation record 78, and may mark the information segments as active segments.

The program code embodying any of the embodiments of the invention described herein is capable of being individually or collectively distributed as a program product in a variety of different forms. In particular, the program code may be distributed using computer-readable media, which may include computer-readable storage media and communication media. Computer-readable storage media, which are inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer-readable instructions, data structures, or other program modules. By way of example, and not limitation, communication media may include wired media such as a wired network or direct-wired connection, and wireless media such as acoustic, RF, infrared and other wireless media. Combinations of any of the above may also be included within the scope of computer-readable media.

The methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

In addition, program code described herein may be identified based upon the application or software component within which the program code is implemented in a specific embodiment of the invention. However, it should be appreciated that any particular program nomenclature that follows is used merely for convenience, and thus the invention should not be limited to use solely in any specific application identified and/or implied by such nomenclature. It should be further appreciated that the various features, applications, and devices disclosed herein may also be used alone or in any combination. Moreover, given the typically endless number of manners in which computer programs may be organized into routines, procedures, methods, modules, objects, and the like, as well as the various manners in which program functionality may be allocated among various software layers that are resident within a typical computing system (e.g., operating systems, libraries, APIs, applications, applets, etc.), and/or across one or more hardware platforms, it should be appreciated that the invention is not limited to the specific organization and allocation of program functionality described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method of adding an ancillary service to an itinerary, the method comprising:
   receiving, at a computer, a request to add the ancillary service to the itinerary, the itinerary including a first travel service associated with a first passenger name record and a second travel service associated with a second passenger name record, wherein the first passenger name record and the second passenger name record are both stored in a document database, and wherein information regarding the itinerary is spread across both of the first passenger name record and the second passenger name record;
   receiving, at the computer, a portion of the first passenger name record;
   receiving, at the computer, a portion of the second passenger name record;
   aggregating, by the computer, the portion of the first passenger name record and the portion of the second passenger name record into an aggregation record;
   issuing, by the computer, an electronic miscellaneous document for the ancillary service, wherein the ancillary service is associated with the first passenger name record and the second passenger name record;
   associating, by the computer, the electronic miscellaneous document with the aggregation record;
   linking, by the computer, the first passenger name record and the second passenger name record and the aggregation record by a mapping record;
   in response to receiving an identifier, locating, by the computer, information related to the itinerary stored within the document database by identifying the mapping record;
   identifying a common passenger across the first passenger name record, the second passenger name record, and common passenger data;
   associating the common passenger data for the common passenger with corresponding information segments from across the first passenger name record and the second passenger name record; and
   merging the passenger data from the first passenger name record and the second passenger name record into the aggregation record.

2. The method of claim 1 further comprising:
   adding first and second booking data for the ancillary service to the aggregation record.

3. The method of claim 2 wherein adding the first and second booking data to the aggregation record comprises:
   adding the first booking data to the first passenger name record;
   adding the second booking data to the second passenger name record;
   copying the first booking data from the first passenger name record to the aggregation record; and
   copying the second booking data from the second passenger name record to the aggregation record.

4. The method of claim 3 wherein copying the second booking data from the second passenger name record to the aggregation record comprises:
   adding only portions of the second booking data to the aggregation record that do not duplicate the first booking data.

5. The method of claim 1 further comprising:
   adding data to the aggregation record;
   copying a first portion of the data from the aggregation record to the first passenger name record; and
   copying a second portion of the data from the aggregation record to the second passenger name record.

6. The method of claim 5 wherein the first portion of the data is added to the first passenger name record and the second portion of the data is added to the second passenger name record in response to issuance of the electronic miscellaneous document.

7. The method of claim 5 wherein the data comprises payment data, pricing data, or issuance data.

8. The method of claim 1 wherein the request includes a record locator for at least one of the first passenger name record and the second passenger name record, and further comprising:
   searching the document database for the aggregation record based on the record locator;
   in response to finding the aggregation record, returning the aggregation record; and in response to not finding the aggregation record, generating the aggregation record.

9. The method of claim 1 wherein aggregating the portion of the first passenger name record and the portion of the second passenger name record into the aggregation record comprises:
adding only data from the portion of the second passenger name record to the aggregation record that does not duplicate data from the portion of the first passenger name record.

10. The method of claim 1 wherein the identifier is a single passenger name record locator.

11. An apparatus for adding an ancillary service to an itinerary, the apparatus comprising:
a processor; and
a memory coupled to the processor and including instructions that, when executed by the processor, cause the apparatus to:
receive a request to add the ancillary service to the itinerary, the itinerary including a first travel service associated with a first passenger name record and a second travel service associated with a second passenger name record, wherein the first passenger name record and the second name passenger name record are both stored in a document database, and wherein information regarding the itinerary is spread across both of the first passenger name record and the second passenger name record;
receive a portion of the first passenger name record;
receive a portion of the second passenger name record;
aggregate the portion of the first passenger name record and the portion of the second passenger name record into an aggregation record;
issue an electronic miscellaneous document for the ancillary service, wherein the ancillary service is associated with the first passenger name record and the second passenger name record;
associate the electronic miscellaneous document with the aggregation record;
link the first passenger name record and the second passenger name record and the aggregation record by a mapping record;
in response to receiving an identifier, locate information related to the itinerary stored within the document database by identifying the mapping record;
identify a common passenger across the first passenger name record, the second passenger name record, and common passenger data;
associate the common passenger data for the common passenger with corresponding information segments from across the first passenger name record and the second passenger name record; and
merge the passenger data from the first passenger name record and the second passenger name record into the aggregation record.

12. The apparatus of claim 11 wherein the instructions are further configured to cause the apparatus to:
add first and second booking data for the ancillary service to the aggregation record.

13. The apparatus of claim 12 wherein the instructions are configured to cause the apparatus to add the first and second booking data to the aggregation record by:
adding the first booking data to the first passenger name record;
adding the second booking data to the second passenger name record;
copying the first booking data from the first passenger name record to the aggregation record; and
copying the second booking data from the second passenger name record to the aggregation record.

14. The apparatus of claim 13 wherein the instructions are configured to cause the apparatus to copy the second booking data from the second passenger name record to the aggregation record by:
adding only portions of the second booking data to the aggregation record that do not duplicate the first booking data.

15. The apparatus of claim 11 wherein the instructions are further configured to cause the apparatus to:
add data to the aggregation record;
copy a first portion of the data from the aggregation record to the first passenger name record; and
copy a second portion of the data from the aggregation record to the second passenger name record.

16. The apparatus of claim 15 wherein the instructions are configured to cause the apparatus to add the first portion of the data to the first passenger name record and add the second portion of the data to the second passenger name record in response to issuance of the electronic miscellaneous document.

17. The apparatus of claim 11 wherein the request includes a record locator for at least one of the first passenger name record and the second passenger name record, and the instructions are further configured to cause the apparatus to:
search the document database for the aggregation record based on the record locator;
in response to finding the aggregation record, return the aggregation record; and
in response to not finding the aggregation record, generate the aggregation record.

18. The apparatus of claim 11 wherein the instructions are configured to cause the apparatus to aggregate the portion of the first passenger name record and the portion of the second passenger name record into the aggregation record by:
adding only data from the portion of the second passenger name record to the aggregation record that does not duplicate data from the portion of the first passenger name record.

19. The apparatus of claim 11 wherein the identifier is a single passenger name record locator.

20. A computer program product comprising:
a non-transitory computer readable storage medium; and
instructions stored on the non-transitory computer readable storage medium that, when executed by a processor, cause the processor to:
receive a request to add the ancillary service to the itinerary, the itinerary including a first travel service associated with a first passenger name record and a second travel service associated with a second passenger name record, wherein the first passenger name record and the second passenger name record are both stored in a document database, and wherein information regarding the itinerary is spread across both of the first passenger name record and the second passenger name record;
receive a portion of the first passenger name record;
receive a portion of the second passenger name record;
aggregate the portion of the first passenger name record and the portion of the second passenger name record into an aggregation record;

issue an electronic miscellaneous document for the ancillary service, wherein the ancillary service is associated with the first passenger name record and the second passenger name record;

associate the electronic miscellaneous document with the aggregation record;

link the first passenger name record and the second passenger name record and the aggregation record by a mapping record;

in response to receiving an identifier, locate information related to the itinerary stored within the document database by identifying the mapping record;

identify a common passenger across the first passenger name record, the second passenger name record, and common passenger data;

associate the common passenger data for the common passenger with corresponding information segments from across the first passenger name record and the second passenger name record; and merge the passenger data from the first passenger name record and the second passenger name record into the aggregation record.

* * * * *